US008595049B2

(12) United States Patent
Eggleston et al.

(10) Patent No.: US 8,595,049 B2
(45) Date of Patent: Nov. 26, 2013

(54) METHOD AND SYSTEM FOR MONITORING INTERNET INFORMATION FOR GROUP NOTIFICATION, MARKETING, PURCHASING AND/OR SALES

(76) Inventors: York Eggleston, Baltimore, MD (US); Llewellyn G. Wall, Herndon, VA (US)

( * ) Notice: Subject to any disclaimer, the term of this patent is extended or adjusted under 35 U.S.C. 154(b) by 714 days.

(21) Appl. No.: 12/923,183

(22) Filed: Sep. 8, 2010

(65) Prior Publication Data
US 2011/0173076 A1 Jul. 14, 2011

Related U.S. Application Data

(60) Provisional application No. 61/272,290, filed on Sep. 8, 2009.

(51) Int. Cl.
*G06Q 10/00* (2012.01)
*G06Q 30/00* (2012.01)
(52) U.S. Cl.
USPC ..... 705/7.29; 705/7.31; 705/14.1; 705/14.25; 705/14.39
(58) Field of Classification Search
USPC ................. 705/7.29, 7.31, 14.1, 14.25, 14.39
See application file for complete search history.

(56) References Cited

U.S. PATENT DOCUMENTS 8,036,929 B1 * 10/2011 Reisman ...................... 705/7.29
2003/0033179 A1 * 2/2003 Katz et al. .................... 705/7
2007/0282665 A1 * 12/2007 Buehler et al. ................ 705/10

* cited by examiner

Primary Examiner — Donald L. Champagne
(74) Attorney, Agent, or Firm — Harbin & Hein PLLC

(57) ABSTRACT

Consumers provide marketers with genuine interest in a particular product, content type or service thereby establishing opportunities to market. Thus, the invention provides a system and a method to produce consumer-defined alerts and notifications about Internet information including a method for modeling consumer interest by tagging such information and aggregating consumer demand for a specific item thereby allowing private one-to-one marketing and aggregated reverse auctions. A method for monitoring and tracking changes to web resources and for managing and tracking the performance of associated marketing programs up to the point of sale. A processes for selection, dynamically storing and aggregating associated alerts data in response to consumer demand, as well as a method of selecting a resource and creating dynamic data to be combined and/or shared with other users.

18 Claims, 12 Drawing Sheets

Current Data Aggregation for Alerts Model Requires
- Agreements with Particular Data Sources or Direct
Integration/interoperation via APIs... Storing of Data Even
Data that is not Demand for use by Anyone

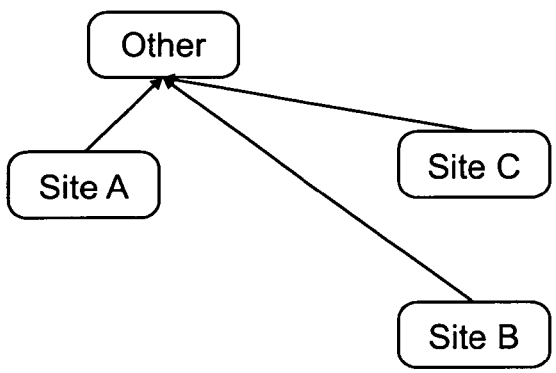

Alertmarks Lives the Data where it is and Monitors it in Real Time...
Technically also Superior - b/c only Call and Monitor What's
Demanded...Less Processing and Less Storage...and no
Integration Needed...

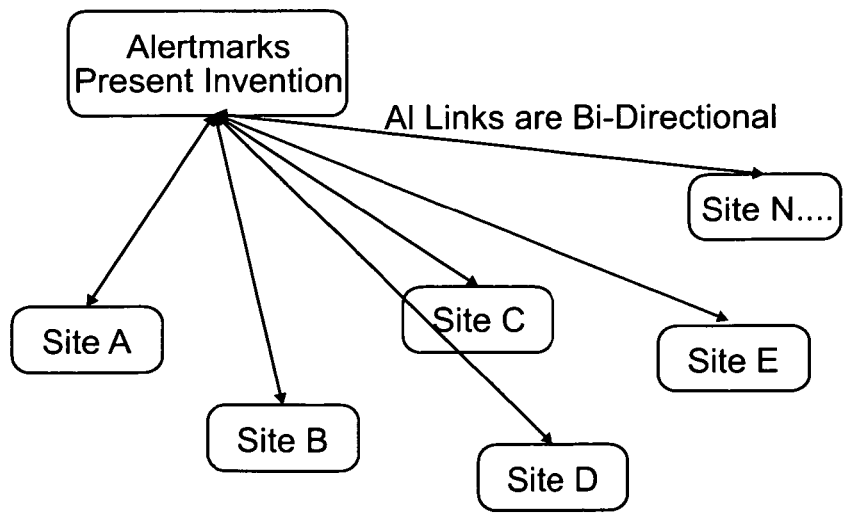

FIG. 8

METHOD AND SYSTEM FOR MONITORING INTERNET INFORMATION FOR GROUP NOTIFICATION, MARKETING, PURCHASING AND/OR SALES

CROSS-REFERENCE TO RELATED APPLICATION

This invention claims the benefit of U.S. Provisional Application Ser. No. 61/272,290 filed Sep. 8, 2009 by the same inventors hereof, and entitled "Information Management, Monitoring and Reporting System to Provide Alerts for Changes in Internet Content, Interest Sharing among Multiple Internet Users, and Group e-Commerce According to Common Interest Among Multiple Users," which is incorporated herein by reference.

BACKGROUND

This invention relates to Internet marketing of product/service promotion and sales, but more specifically, to a method and system to monitor consumer demand and to generate marketing and sales options in response thereto.

With every news article, comment, company, new product or service that becomes available online, the Internet continues to expand. Current web tools fail to address the problems of information complexity and overload. Past solutions have relied on publishers defining the content to be made available via RSS (Really Simple Syndication) feeds (or other general exportable formats available), common formats such as XML, proprietary formats by site publishers, or by providing tools for the selection and storage of portions of the web that interest a given user. These solutions suffer from significant drawbacks for either the consumer and or the marketer, and ultimately fail to provide clarity amidst an overloaded and overly complex Internet. With its ever increasing vastness, the Internet is failing to optimize the process of helping people find what they want, compare, stay informed, share, and or discover new information. And likewise, it is failing to provide a true method for consumers (and businesses) to declare what they want and therefore facilitate a more efficient method of marketing and sales—one to one.

Introduction of Aggregating Filtering Techniques

Really Simple Syndication (RSS) was first used to allow for quick incorporation and usage of content from one source or site to another, by providing a basic format for publishers to select and present information that could be integrated into third party sites and later read as feeds by individual (consumer) reading software, which parsed and formatted the data according to the rules embedded in the RSS or Extensible Markup Language (XML) or its derivatives.

Over the past several years, RSS has been used as the underlying technology for providing information aggregation and filtering services. For example by aggregating and different feeds and incorporating textual analysis techniques, Internet firms have been able to save consumers and businesses time by sorting through information from the site publishers and presenting information that meets a particular criteria defined by the user.

Commercial attempts have been made to address some of the problems of growing information, in particular content overload as firms such as Twine, Iterasi and iLeonard, Filtrbox (see attached articles) and Google Alerts have sought automated solutions to help one filter information. These firms seek to aggregate feeds or access services that aggregate feeds (i.e. firms using Google Alerts to apply their own filtering techniques) in order to filter information that disseminated or notify based on a the presence of a user selected keyword or phrase.

RSS, even in new or similar formats suffers from its inability to handle dynamically changing data, as it fails to incorporate frequency and timing of delivery as well as a method for viewing versions over time. Likewise, once published the RSS format fails to have any built in version tracking or history capture, thus making it a transactional method of data aggregation and review. In addition, much of the what is available on the net, commerce, advertising and search (general and specific) included, along with many consumer (e.g. blogs, wikis, etc.) and professionally published sites, lack RSS capabilities. The true weaknesses of RSS in handling dynamic data are revealed.

Web-Clipping and Other Static Reference and Storage Methods

In addition, there have been advances in techniques to select and capture data (including text, pictures, video) from a webpage or website primarily for reference in the form of bookmarks, which permit one to return to a given site address or URL (universal resource locator) or other services which permit "clipping" of specific content from a site for sharing and storage. Bookmarks suffer from the inability to select specific content as well as from the ability to deal with the dynamic nature of the content that my be on a page—it is only a method of taking you back to a web address, it fails to provide a method for determining if any of the content on the address changed or has been moved. Thus, it is like having an address to a friend, with you returning to the house, you realize that they no longer live there—you wasted a trip and have no way of knowing where they have moved to . . . .

In addition, other firms have sought to provide tools which allow consumers to collect or "clip" pieces of information or content on the web as they surf. Once collected these services provide methods of storage, categorization, search and sharing. Unfortunately, in the long-term there solutions do not solve the problems of information overload (they exacerbate it) as more information is added even as the information gets older and older in storage. Further, clipping services, such as Notemarks™ or Clipmarks™ or Evernote, fail to be relevant for all types of sites such as commerce sites or search engines, advertising (or ad networks) or other resources such as feeds. The present invention makes the timeliness of the information relevant—not just when it was created, but also when a particular resource became web accessible. If it is web accessible, the present invention allows it to be monitored, manipulated and shared.

While, "feed"-based or "clipping" technologies attempt to provide tools to manage the Internets' vastness and complexity, they suffer greatly because of the underlying systems and methods embedded in their technology which drives their services.

Publisher Driven Approaches to Net Information Overload

Even new offerings in the "Alerts" space such as Alerts.com or Zotify or Web slices embedded in Internet Explorer 8, fail to solve the current information overload and complexity issues across the web. These services rely on current formats such as RSS or new formats for alerts creation, or embedding new code or features in their websites, for it to be accessible for alerts and notifications by a user. These methods are publisher driven and publisher limiting.

SUMMARY

In accordance with a first aspect of the invention, there is provided a method of monitoring Internet information to generate a sale of a product or service. The method comprising the steps of providing a user interface linked to an Internet server to enable multiple users to define respective alerts regarding an Internet resource about said product or service; aggregating said user-defined alerts to determine an aggregated interest in said product or service; in response to said aggregated interest, notifying a marketer of said product or service via electronic messaging (e.g., IVR, mobile or SMS messaging, Internet user interface application) of said aggregated interest; enabling said marketer to generate a sales offer; and communicating said sales offer to said users via said Internet thereby to produce a sale of said product or service.

In accordance with a second aspect of the invention, there is provided a method of monitoring Internet, information to generate a reverse auction respecting sale of a product or service wherein said method comprising the steps of providing a user interface linked to an Internet server to enable multiple users to define respective alerts regarding an Internet resource about said product or service; aggregating said user-defined alerts to determine an aggregated interest in said product or service; in response to said aggregated interest, notifying said users of said aggregated interest in said product or service via electronic messaging; enabling said users to generate a volume purchase offer for said product or service based on said aggregated interest; and communicating said aggregated purchase offer to a supplier of said product or service thereby to produce a sale.

In another aspect of the invention, there is provided a method of monitoring Internet information to identify of group of users having a shared interest in a piece of information, said method comprising the steps of proving a user interface linked to an Internet server to enable respective users to define alerts respecting an Internet resource; aggregating said user-defined alerts to determine an aggregated interest in said piece of information; and in response to said aggregated interest, notifying said users of said shared interest in said piece of information.

In contrast, the present invention provides a method for consumer defined creation of the data or sources to be monitored for creating "alerts." In other words, the present invention provides a method for user-created and defined alerts without the aid of particular formatting or presentation by a particular or group of publishers, i.e., RSS or technical formatting advocated by Alerts.com or Microsoft as part of its IE8 (web Slices). The present inventions allow for websites and sources to be available and defined or selected by the consumer, without any need for the publisher to do any special formatting, or the use of any special software.

According to the present invention, the user selects which resource, e.g., website or section of web page they wish to have monitored and the criteria for alert notification and the channel for notification delivery thereby removing constraints of alerts being limited to those created and published by the site publishers from a set of sites. The present invention provides the monitoring work for the consumer thus, enabling users to create a virtually unlimited amount of alerts based on the content and criteria.

These and other aspects, advantages, and features of the invention will become more readily apparent upon review of the succeeding description taken in connection with the accompanying drawings. The invention, though, is pointed out with particularity by the appended claims.

BRIEF DESCRIPTION OF THE DRAWINGS

Figure 4:
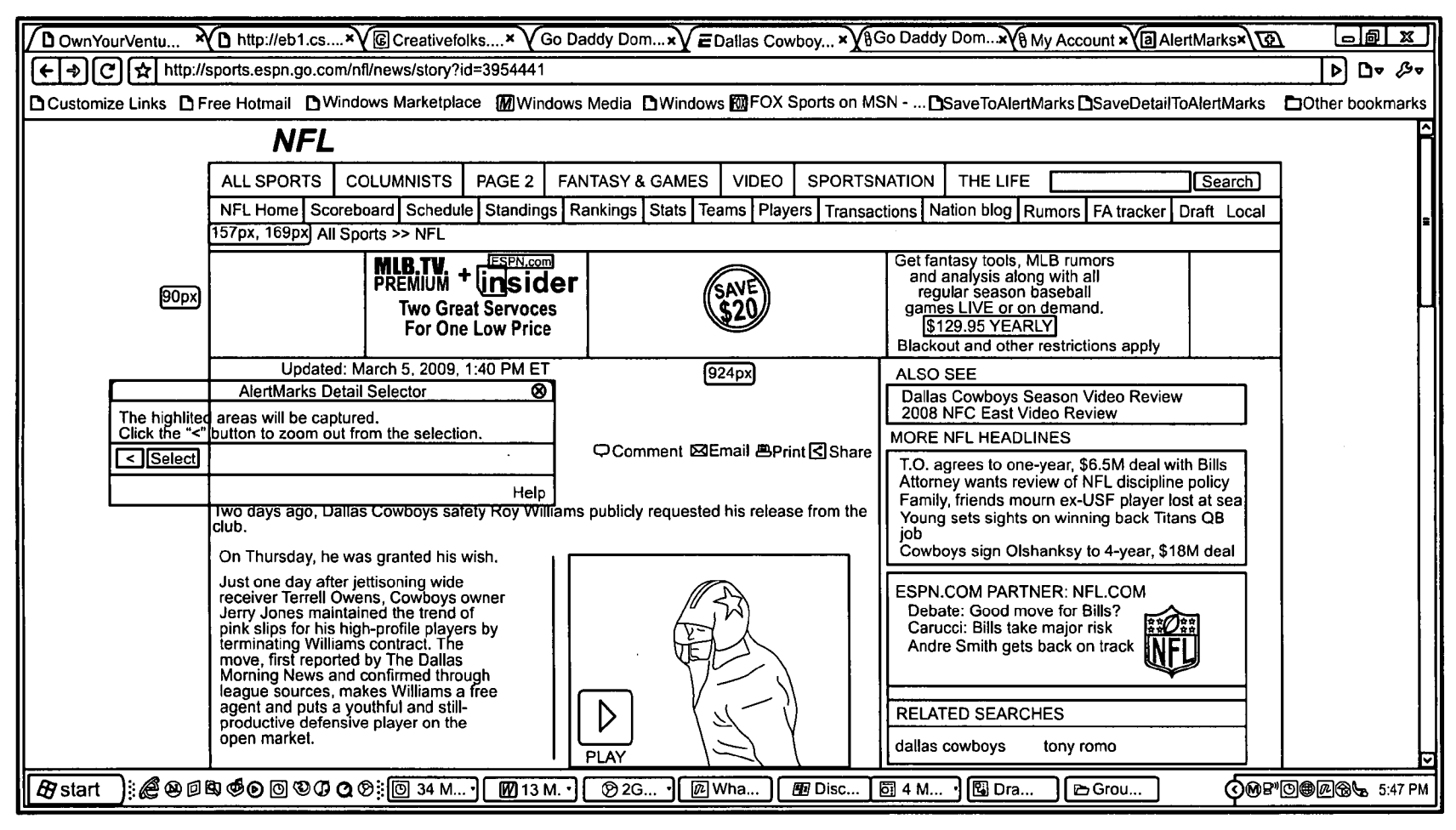

FIG. 4 shows an example of "ad clipping."

FIG. 7 illustrates a real-time price comparison made by the system based on information derived from selected resources.

FIG. 8 shows a comparison of a prior art system and the present invention in assimilating information from various resources to derive, for example, a price comparison.

DESCRIPTION OF ILLUSTRATIVE EMBODIMENTS

Figure 1:
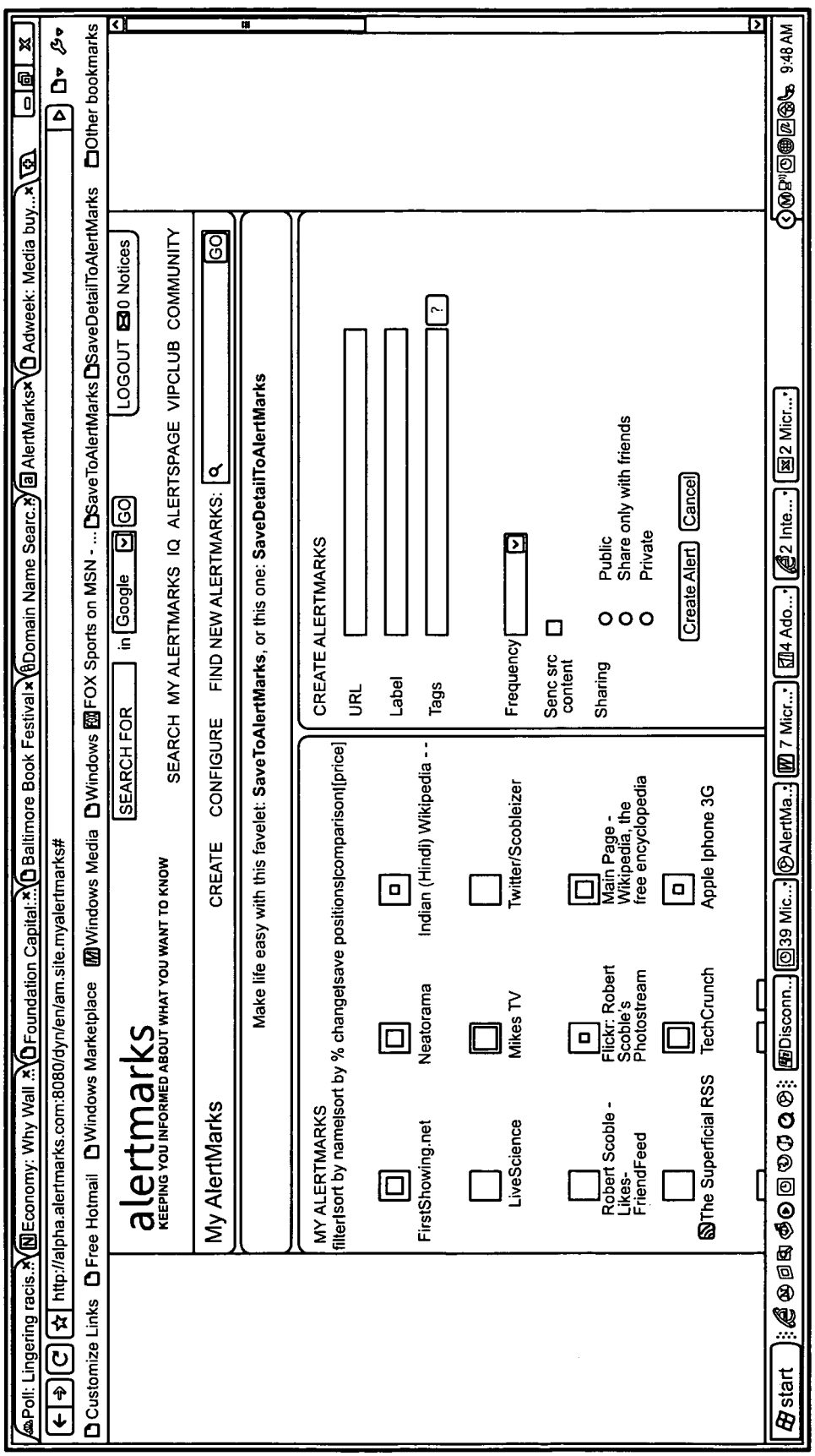
FIG. 1 illustrates an overview of the Internet content management, monitoring, and reporting (alerting) method and system in accordance with an aspect of the present invention.

As used in this disclosure, an Alert/Notification is a reminder based on a rule or trigger of behavior, date or event.

An Alertmark™ is a user-defined content section for monitoring and notification based on a user defined or customizable criteria. An Alertmarks could include straight notifications text based notifications or it may include visual indication of status of change for a given Alertmarks or collection of Alertmarks. There are multiple types of Alertmarks, based on the method to create them or the source of their monitoring—i.e. Rmarks™ for tracking and notifying changes to RSS feeds or DMarks™ for selecting or Pushmarks™ or PMarks™ coming from Mobile, tracking and notifying on changes to information contained within a web page—which may include a price.

Intention Continuum is ongoing process of developing an awareness or consciousness regarding a given product, service, or content, resulting in a transaction (finding and go to location, purchase, etc.)

Savelet is mini application or process, i.e., a set of computer program instructions, that may be integrated with a toolbar of a graphical user interface providing for customizable functionality.

The invention, which is preferably implemented via applets or other applications transmitted in a client-server configuration over the Internet, allows web information to be filtered, monitored and compared for change analysis with the ability to provide personalized alerts based on user defined inputs (a page or fraction of a page selected by the user in addition or in place of a selection of an RSS feed) from any website (including search and commerce sites, not just sites with RSS feeds) or web applications with other output criteria. The sites with varying functionality including search, commerce and publisher and user-generated content or applications can be monitored on a distributed basis with aggregation done in Teal time demand, and can include recommendation based on criteria selected, demographic, geographic and or psychographic profile of the user. As defined herein, an Alertmark™ is a method of selecting a resource and creating dynamic data which can be combined and shared with resources on the web. It is uniquely declarative of both interest and/or intent by an Internet user, providing a novel method for more efficient resource allocation in providing a service as well as an invaluable insight to a prospective marketer.

By allowing for consumers to decide and determine which resource they most desire to be alerted about and by providing additional methods to further refine the resource and the data (and showing the level of intensity for a given resource monitoring, in the selection of the number of channels they want to be alerted on and the triggers for being alerted), the consumers thereby provide via communication links established by the invention product owners and marketers with a genuine interest in a particular product, content type or service—establishing true opportunities to market; something other sites on the web do not. Taking individually, this declared interest and intent, provides a unique method for one to one marketing. In aggregate, the opportunities to market may also provide a reverse auction opportunity which provides efficiency over current selling methods. This allows for marketing based on what the consumer expresses via alert and notification they are interested in or want—not just based on what the consumers says. Potential degree of interest or wants may be inferred from the frequency of an alert configuration, which may then be communicated to a marketer.

Additionally, computer-implemented processes according to present invention include program instructions to generate an indication of interest (IofI) or provides a system for declarative interest and intent (i.e. what one cares about and where one is going or wants to do with information on the Internet); which can provide further indication of intensity based on specificity of content selection (page or section of page or specific content), clipping, clipping with monitoring, destination return (e.g. bookmark), the number of sites on the same subject or price or based on the frequency of monitoring, time for automated removal of monitoring, channel for notification of changes and type of notification, including analysis of the amount of change and delivery of status of change or the content (e.g. price or article, etc.) to a user over a given channel another contributor indicating intensity.

Further, such processes create a model of consumer interest which includes initial indication, level or intensity and timing—key components in driving purchase behavior; allowing for better matching of promotions and marketing to consumers and better matching up products/services to consumers. It does not require any information based on demographics—the leading technique used by marketers to predict level of interest, even absent timing. Prior methods, which are publisher driven do not provide the full ability for the consumer to indicate their level of interest, limiting consumer selection to a few "channels" or "feeds" which were preselected and made available by the publishers or a publisher aggregator.

Response criteria to trigger a notification over a given communication channel such as interactive voice response, text message (mobile), email or web based application or desktop/kiosk based widget may include, but is not limited to, the presence or lack of a presence of a keyword(s) in the selected area or text, picture or video being monitored and/or time of day and/or amount of change of the text or picture from the previous version and or percentage change (for a price, etc.) and/or location of the user. Computer-implemented processes or program instruction also permit alerts to be created from different types of sites or resources, including search, commerce and content sites, which may or may not be password protected or may requiring automatic submission of specific knowledge and multi-step content monitoring.

Such processes also create an interest profile (via an Alertmarks dashboard) which can be used to develop campaigns to persuade intent, including spurring one to complete a transaction (i.e. targeted sales promotion). These processes may also address privacy issues by enabling users to opt-in or out during configuration of the there selected notifications or alerts.

The system also provides a method and/or data processing apparatus embodying computer program instruction to effect aggregation of consumer demand by monitoring and aggregating Alerts selected by multiple users, increasing efficiency in the presentation for opportunities to buy. As an example, when ten people monitor television sets, they represent an identifiable pool of potential buyers (they have explicitly stated their interest in creating an alert) so they may generate and participate in a reverse auction opportunity. The sales organization thereby obtains an opportunity to sell volume and potentially lessening selling price and marketing expenses. Thus, the invention includes a method and/or an apparatus for developing an aggregated purchase order, notifying the multiple users of the aggregated purchase order, sending the aggregated purchase order to the sales organization, and providing a system to generate an aggregated invoice in response to the aggregated purchase order. Aggregated billing, payment and product shipment may also be established to complete the sale to the multiple users.

An exemplary embodiment includes an application executed on a computer platform that is accessible via a website or web address, URL, though it may also be activated from a tool bar, a mobile application (e.g. gadget or widget), desktop downloadable application, IVR, or mobile phone—all "touchpoint" services. In the preferred embodiment of the current invention, a user establishes an account (though it is not necessary) at the Alertmarks website and drags an activation button "Save to Alertmark" to the browser bar. A user then surfs the web via one of the current web browsers or their derivatives such as Firefox, Safari, Chrome, Opera or Explorer, Communicator, etc as they normally would. After coming to content of some interest on one of the sites, the user selects the activation button at which time the software grabs the specific location of the selected content and stores the reference to a temporary section of the users account (i.e. database). The user then is presented with the opportunity to configure the service including the ability to determine the frequency for this resource to be checked for changes, the triggers for notification i.e. time frequency, a target numeric amount (such a price threshold—less than $10), a geographic location of relevance to the content, or another time or event driven parameter available from configuration or derived via development or API extension, and the channel or method of notification of change or deliver of the updated selected content.

As illustrated in FIG. 1, by entering the address from the website or by surfing to the website—any kind of site, from search to commerce to content—and then selecting the SaveToAlertmarks or the SaveToDetailMarks Button in the toolbar, one can specify exactly what data they want to select from a given resource. Once the selection has been configured, the resource and its user defined (an auto default is also available) configuration is associated with the consumer account. Additional methods of content selection, includes searches, search results, individual commerce selections, based on content on the alertmarks site or virtually any other resource on the web, including password protected sites or deeply embedded resources—resources which may require Alertmarks unique multi-step data capturing techniques and processes.

Program instructions or applets implemented by a user's client processor that also generate the user interfaces now begin to monitor the resource. These activities may also be carried out by an Internet server on behalf of a user. Thus, a user account may be established in a memory associated with the server. Changes in a selected resource may be examined and reviewed by examining the consumer dashboard (displayed on a user's client computer display device) or according to configuration settings, via the receipt of emails, IVR, short messages to one mobile phone, etc. Even historical changes can be monitored for the given resource with the ability to perform analysis or request similar types of resources. Additionally, given the expressed or declared interest by the selection and configuration made by the user, the system is able to select content (via selections or feeds), commerce, search, applications (e.g. mortgage calculator for someone monitoring the prices of houses on Realtor.com) or Alertmark resources which may match the declared interest.

Marketers are also able to view interest and make offers available to the anonymous users—interest is known, but who has the interest is not known. When several users have similar interest, the interest can be aggregated for reverse auction or aggregated buying opportunities as well—with consumers reached directly (if previously authorized) or the user may be invited to a real-time Interest Auction—an auction triggered after reaching a given consumer demand threshold for a given product or service—whereas the vendors/businesses bid for the aggregated consumer interest. The aggregated demand allows individuals to gain the benefits of economies of scale in sales and marketing and volume purchasing.

Figure 2:
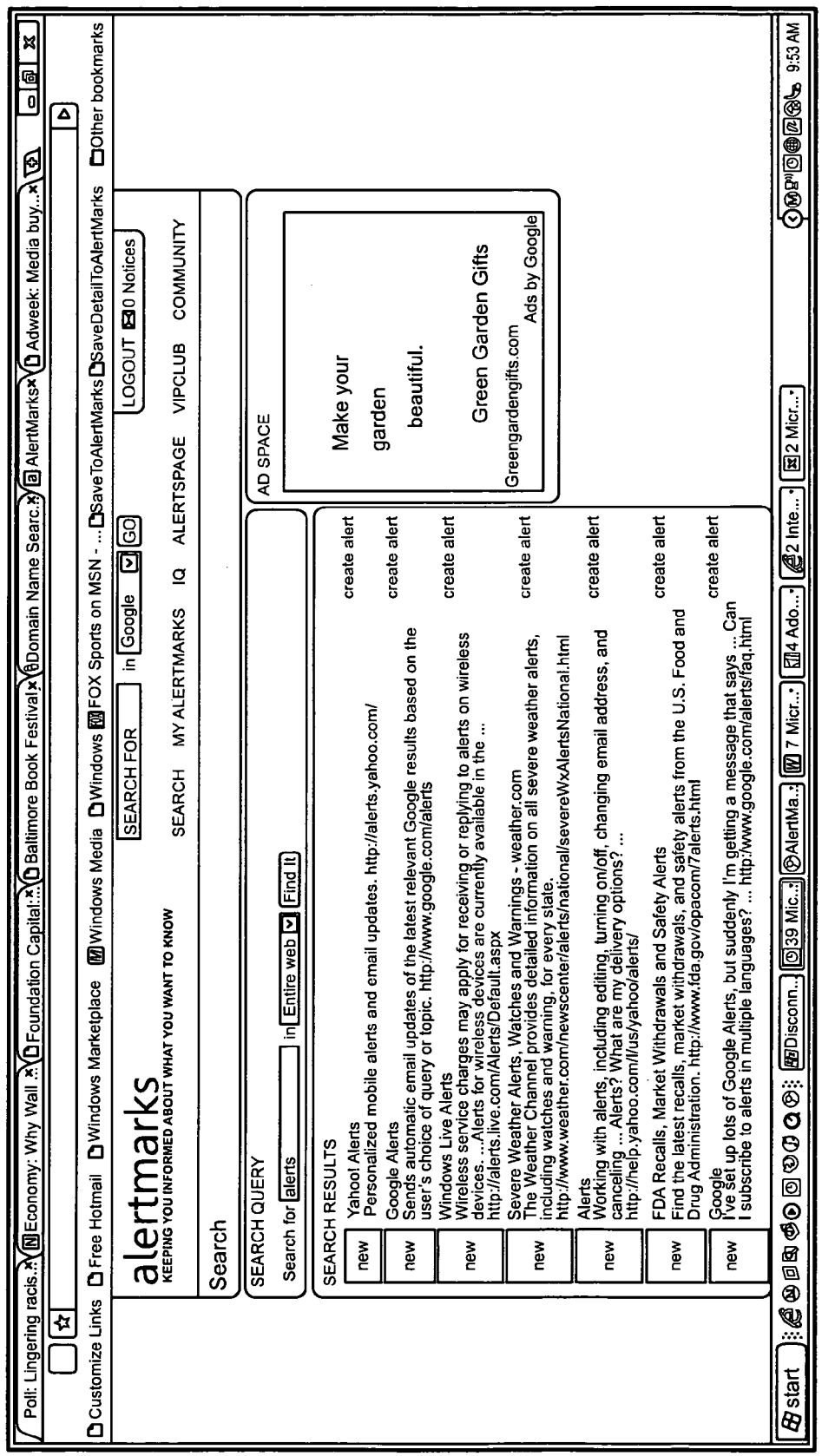
FIG. 2 shows an exemplary web page or "dash board" presented to a user when actively using the system of FIG. 1 in order to create a custom alert.

FIG. 2 shown custom alerts created based on search result.

Figure 3:
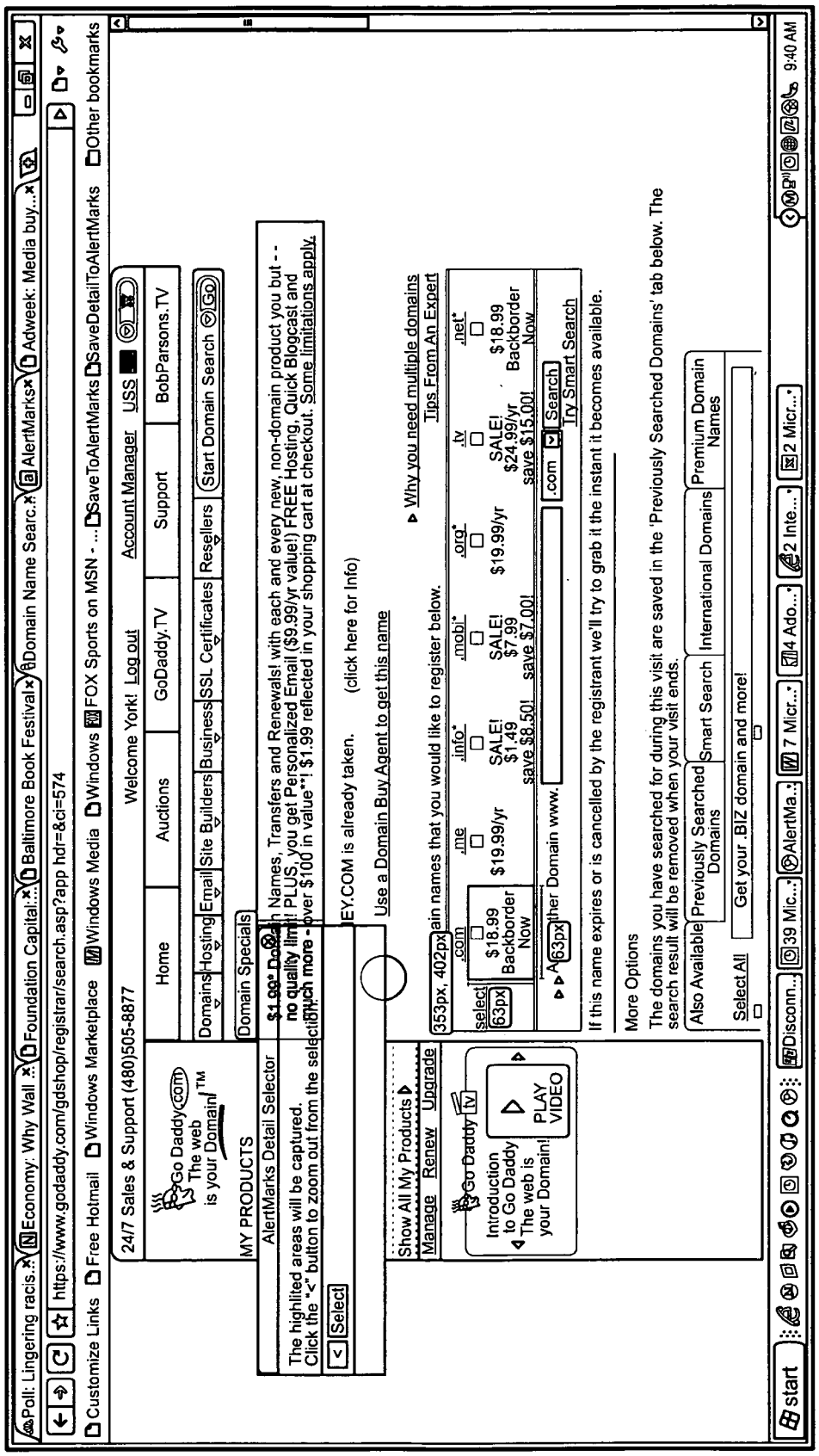
FIG. 3 shows an example of selection of a "Detail Element" of a resource, such as price information.

FIG. 3 shows an example of Selection of Detail Element (Resource)—price and descriptive text for a domain;

FIG. 4 shows an example of "ad clipping."

Intent of user is given or can be implied directly from the selection. And as the resource or content selection is monitored and alert information is relayed to the users, there are numerous opportunities for intent persuasion as recommendations and or alternatives and or additional inducements to make the purchase.

Figure 5:
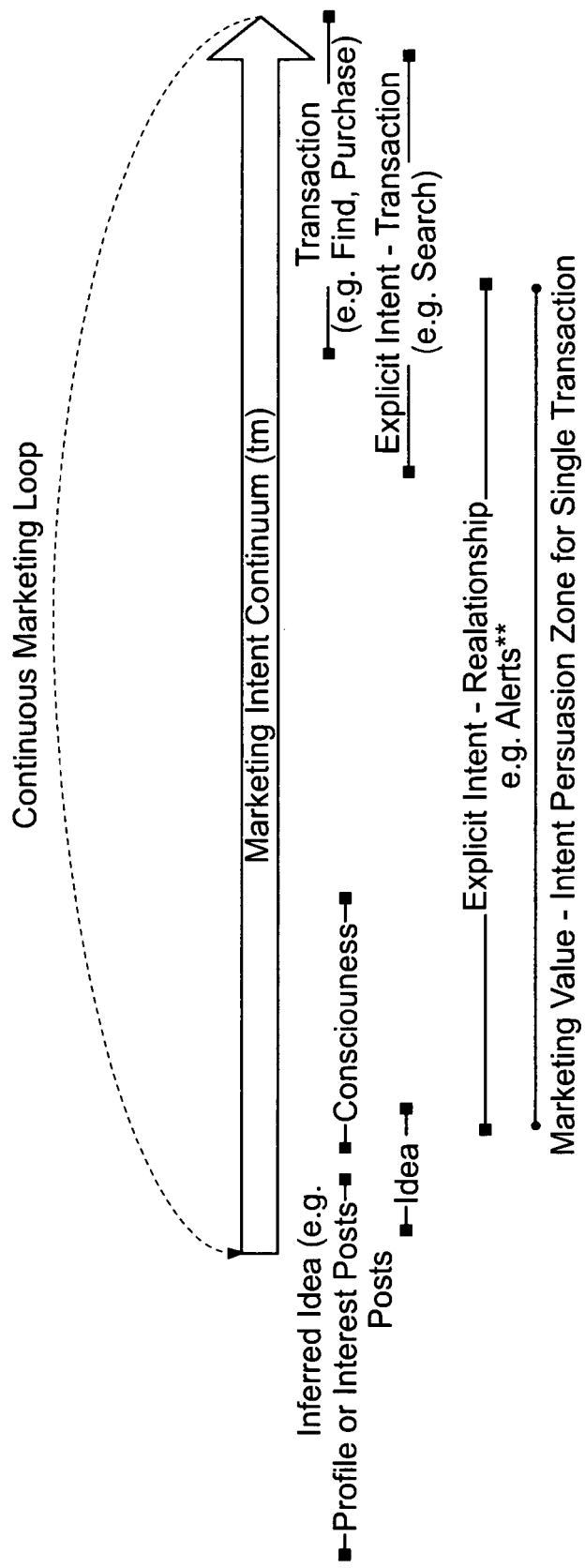
FIG. 5 illustrates consumer use of the interfaces and selection processes define an "Intent Continuum."

As illustrated in FIG. 5, the consumer's use of the interfaces and selection processes define an "Intent Continuum;" providing intent indications along the way towards and post the completion of a transaction (finding content, completing a purchase, etc.). In some ways, it can serve to combat search abandonment, providing systems and methods for consumer intention expression over all types of sites (content, commerce, search and or advertisement sites (or networks)).

With respect to advertisements, the present invention provides a unique method for one to express in ads (as stand alone pieces of content or as part of ad networks) by providing a mechanism to save them for later. Thereby one can express interest without abandoning a current activity and continue to interact with the ad later. The opportunity would have been lost previously as the ad was forced to compete with content that one had often self-selected. One may have been interested in the ad, but not enough to be distracted from the content they were engaged.

Figure 6:
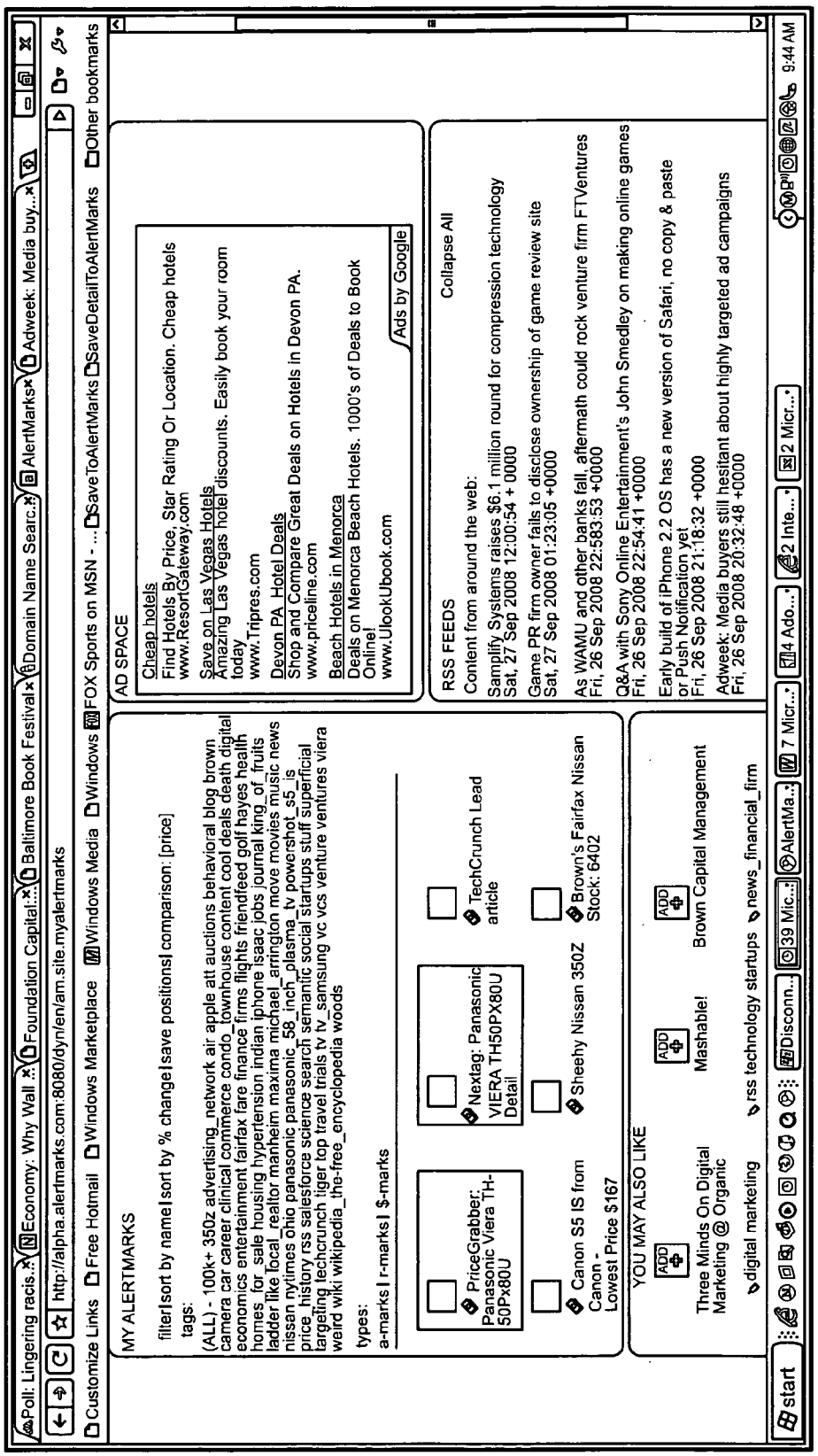
FIG. 6 illustrates a suggestion or recommendation "You May Like" generated by the system based on a declared interest as part of Intent persuasion process.

FIG. 6 illustrates a suggestion or recommendation "You May Like" generated by the system based on a declared interest as part of Intent persuasion process.

Figure 7:
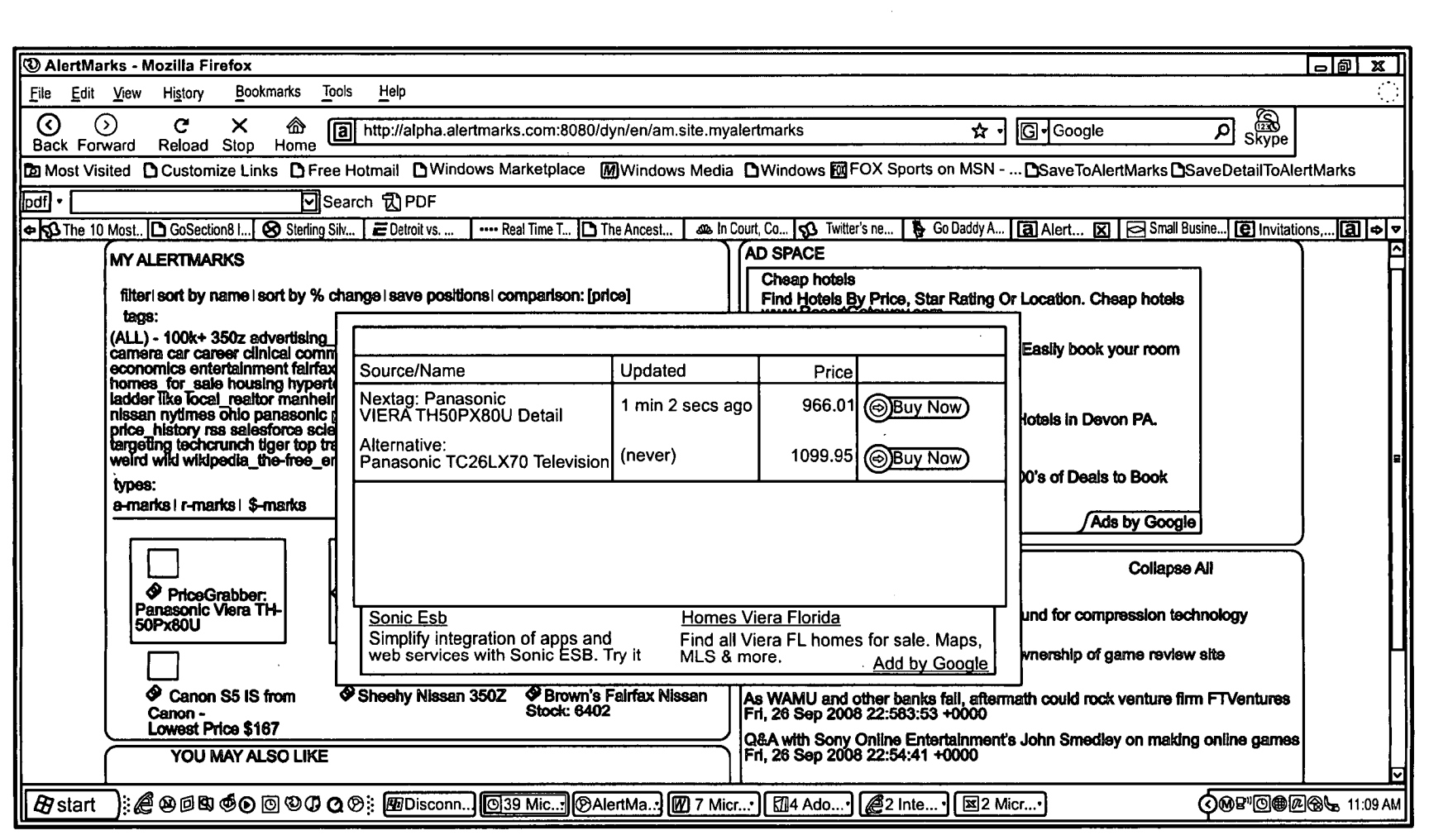

FIG. 7 illustrates a real-time price comparison made by the system based on information derived from selected resources.

Advantageously, processes implemented by the various hardware/software elements of the present invention, unlike search or RSS aggregation services, need not monitor any resource that is not demanded by the user. The other services have to aggregate all the information, feeds, index the web, etc. "just in case" someone requests the information. The present invention only monitors and tracks information that has been demanded. Yet, further empowering the user, the present invention provides a method for real time comparison as prices that have been individual selected and across different sites. Current price comparisons are done by site level—sites determine the feeds used to compare. The present invention provides a method for real-time price comparison, by allowing for monitoring prices according to a real-time aggregation driven by the user.

FIG. 8 shows a comparison of a prior art system and the present invention in assimilating information from various resources to derive, for example, a price comparison.

The system enable selection of specific Web pages or sections of Web pages to be monitored 24/7 and to be notified immediately of updates or changes and also has the ability to automate searches and report any changes in the search results. The system provides an indicator of changes to a site or to search results, which can be presented in various formats and over different communications channels such as websites, desktop widgets or mobile phones. Methods implemented by the present invention combine content from multiple sites being reviewed, and analyzes and monitors the content for changes, and then handles presentation and delivery of the results to multiple channels.

A basic service provided by the invention includes a section for enhanced metasearch, a section for social networking as well sections for Alertmark™ creation and management, and configuration of alert channel delivery. Many of these basic services offered on the site can be: accessed without signing up, as can limit personalization capabilities. The services available on the site extend beyond the traditional bookmarks (see www.netvouz.com or www.delicious.com) and the basic Alertmark™ feature set. In addition to the ability to perform searches as part of a metasearch (for general interest or specific interests such as jobs, shopping, etc.), users can manage Alertmarks™, including deletion, editing, tagging, and filtering. With free signup, the service, as well as personalized Alertmarks™, can be accessed from anywhere with net connectivity and the results can be sent to designated devices. Registered users can also create Alertmarks™ for password protected sites, as well as search across the social network for Alertmarks™, receive Alertmarks™ from their friends, and be the beneficiaries of dynamically created personalized Alertmark™ suggestions.

Once an Alertmark™ is created, it appears visually on screen in a dashboard format. Each Alertmark™ is a simple box-shaped icon. The Alertmark™ changes color to indicate changes to the Web site being tracked. Future embellishments may also permit branded images or logos from the selected sites (e.g., the NBC peacock, for example) to be used as the visual Alertmark™ icon via pre-loading or consumer selection and upload. The easy to view interface permits users to quickly scan their list of Alertmark™ sites on the dashboard and easily ascertain which ones may warrant a direct visit. Simply clicking on the Alertmark™ takes the user directly to the site being monitors. It also take them directly to the specific area of the site they may have selected to monitor. Additionally, by utilizing the configuration feature available to registered users of the site, users can specify the transport medium for receiving alerts, including SMS or email.

Placing the cursor over (or highlighting) a given Alertmark™ opens a pop-up box giving the user a more detailed window onto the site (or section of a site) being monitored, including information such as percentage of change, the ranking of the Alertmark™ across the social network based on usage and user rating, associated descriptive tags and the availability of social network comments or reviews. The detail window also presents a comparison thumbnail view of the site which highlights changes on the site since the last time the user looked at the Alertmark™—all without leaving the website dashboard or desktop widget.

In addition to all of the above, the site also leverages the tremendous amounts of data generated by the association between established Alertmarks™, and allows users to learn from others who are part of the Alertmark™ social network. Users are able to classify their Alertmarks™ as private or public; public Alertmarks™ can be shared with friends, who are also notified when new ones are created. Other social networking features include a list of the most active alert sites, and comments and reviews of selected articles, products or services by people who have chosen to Alertmark™ similar content.

In another embodiment of the invention, publishers may have the ability to offer Alertmark™ tags on their sites, allowing for convenient creation of Alertmarks™ within the site, even if the site does not have built-in alert capabilities. In addition to allowing consumers to tag their sites, permitting the quick return to a site for specific content, publishers will have the ability to create their own Alertmarks™ which Alertmarks™ members can search and which will give them access to data on site visitation and relevant usage (within the bounds established by the service's consumer privacy policy).

Registered users will also have access to other tools, including Savelets™, tag filtering, menu bar additions, mobile thin clients and desktop widgets—all aimed at either easing the process of creating an Alertmark™ from a site the user may be visiting or increasing ease of locating or viewing of Alertmarks™ when not viewing them directly via a browser or on the Web.

Figure 9:
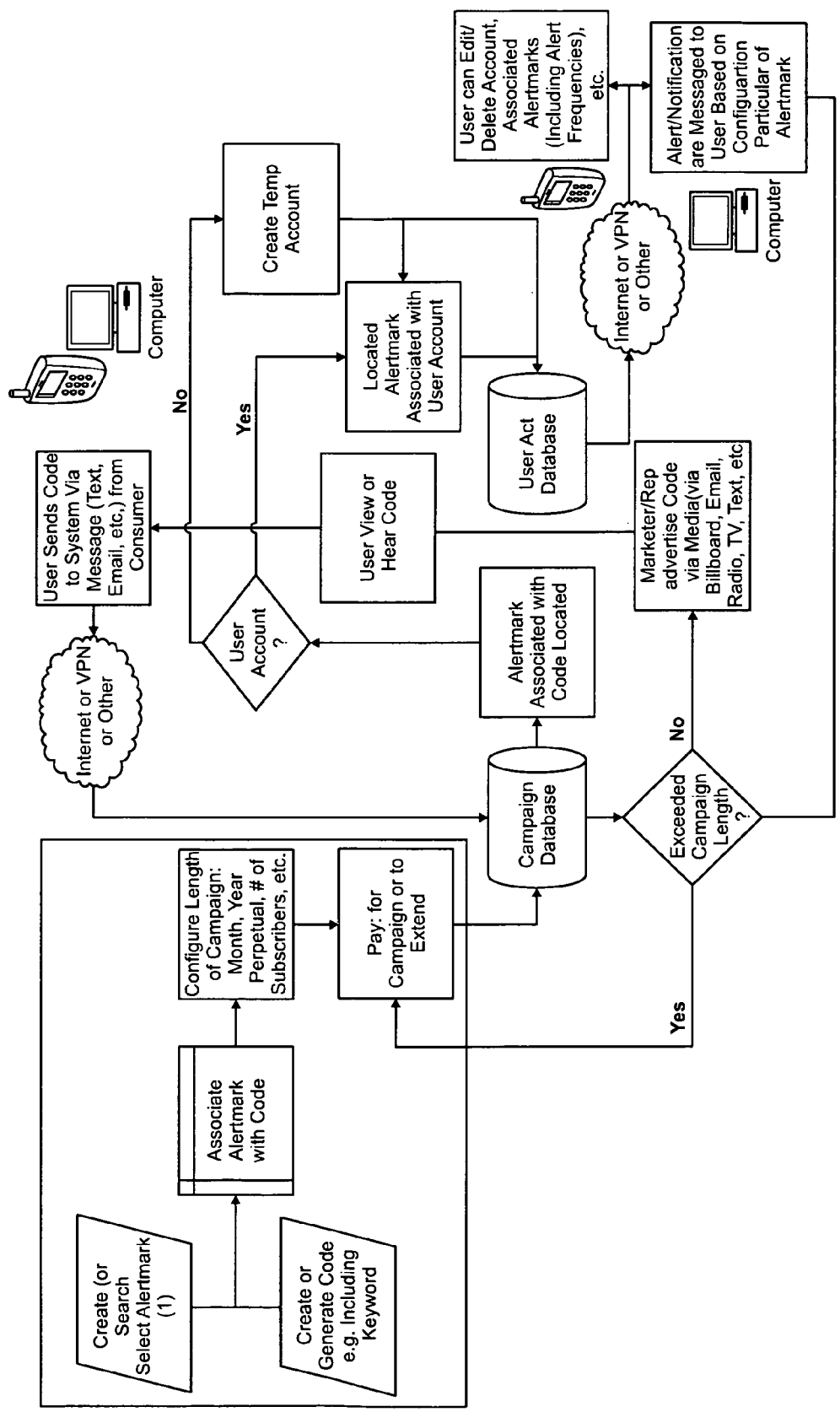
FIG. 9 shows an overview of a process for creating and using an Alertmark to monitor and report status of an Internet resource in accordance with the present invention.

FIG. 9 shows an overview of a process in a system or apparatus for creating and using an Alertmark to monitor and report status of an Internet resource in accordance with the present invention.

Figure 10A:
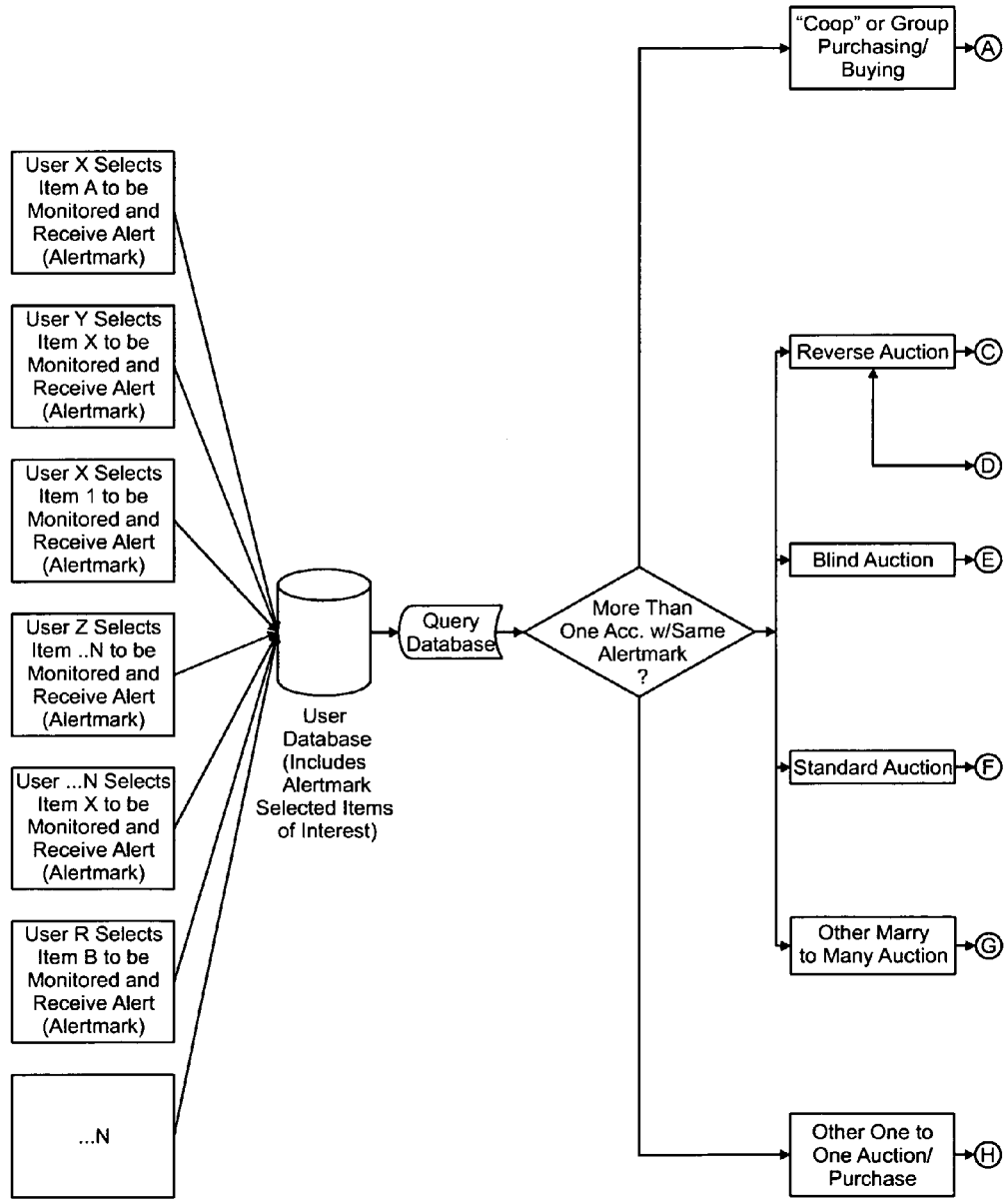
FIGS. 10A, 10B, and 10C show process flows of potential utilizations of respective user-defined Alertmarks stored in a user database that include among other things group buying, reverse auctions, one-to-one marketing, and many-to-many marketing.
Figure 10B:
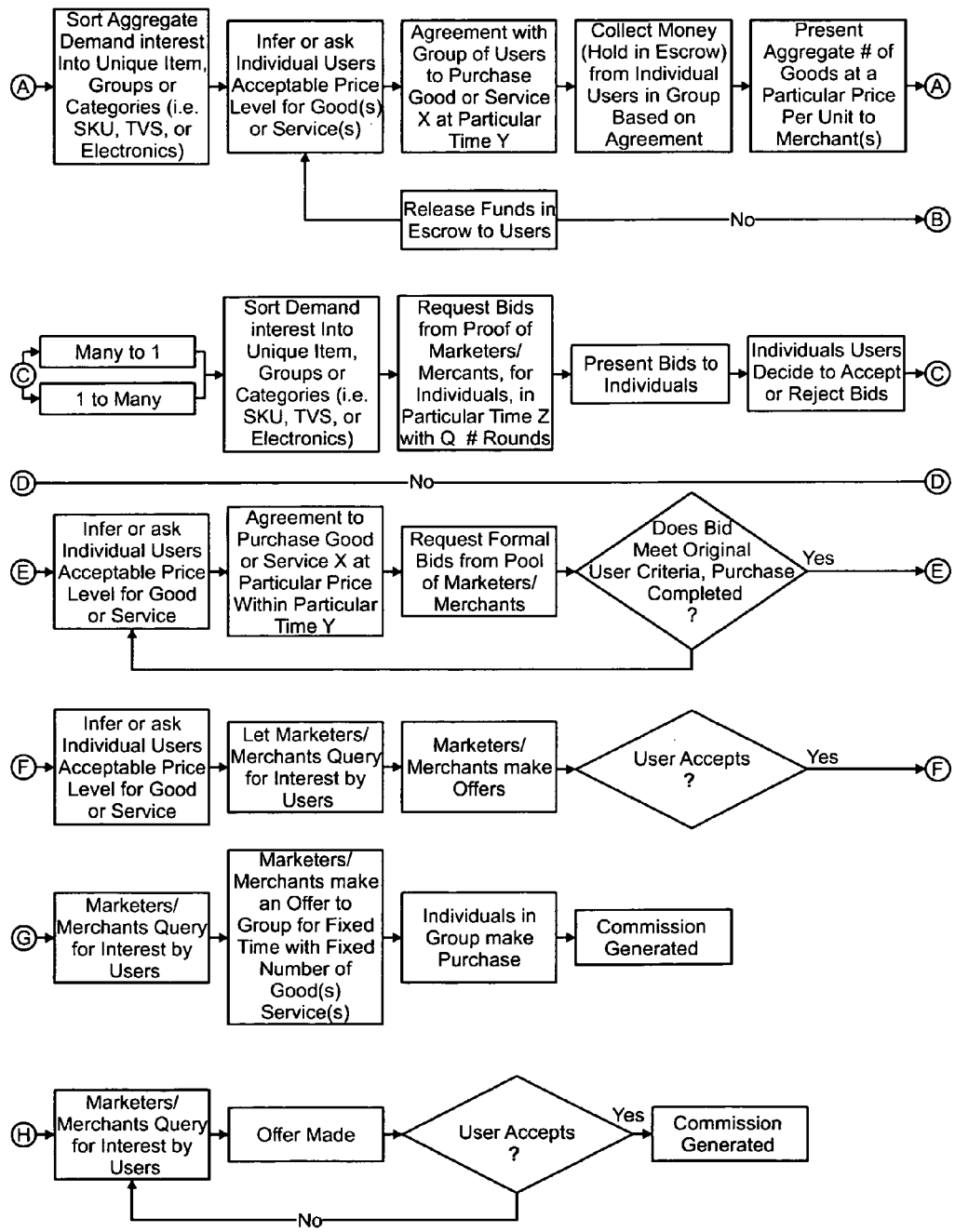
Figure 10C:
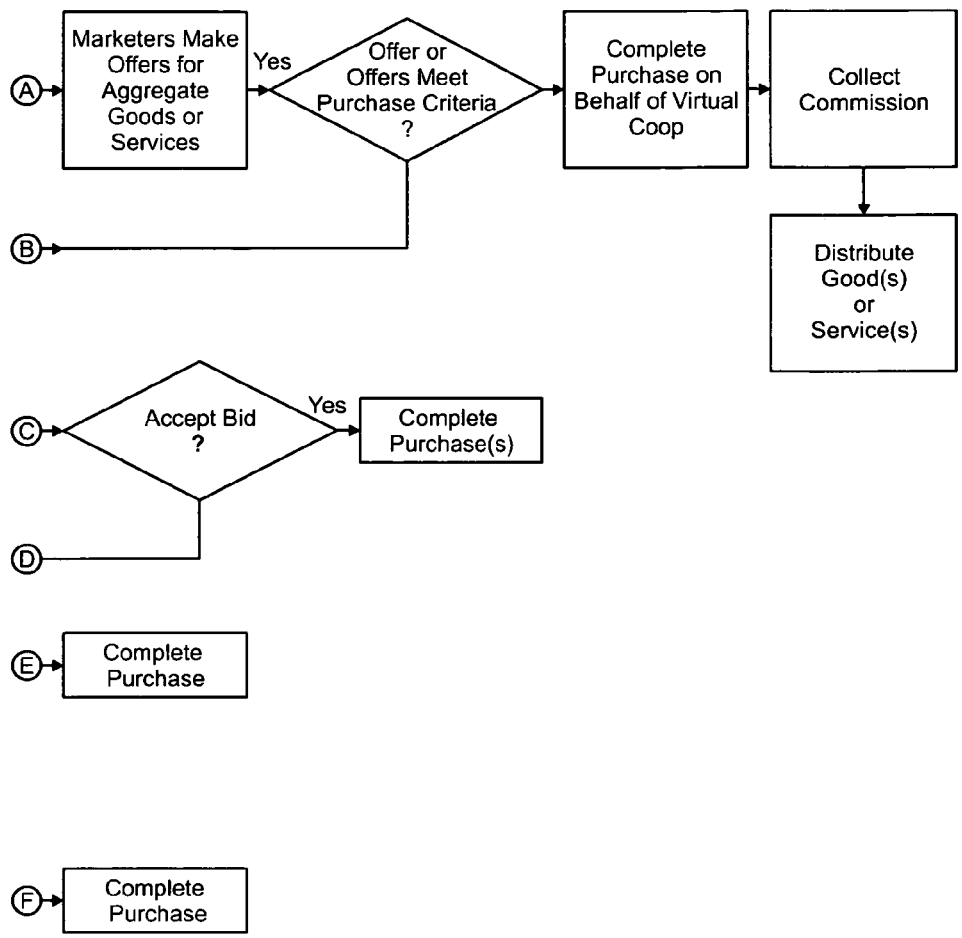

FIGS. 10A, 10B, and 10C show process flows of potential utilizations of respective user-defined Alertmarks stored in a user database that include among other things group buying, reverse auctions, one-to-one marketing, and many-to-many marketing.

The foregoing illustrative embodiments provide exemplary methods and systems by which the invention may be carried out. Variations and adaptations as may come to those skilled in the art based on the above teachings may also come within the scope of the appended claims.

The invention claimed is:

1. A method of monitoring Internet information to produce a sale of a product or service, said method comprising the steps of:
provide a user interface linked to an Internet server to enable multiple users to define respective alerts regarding an Internet resource about said product or service;
creating and storing user accounts in a database with associated user-defined alerts;
accessing said database to aggregate said user-defined alerts to determine an aggregated interest in said product or service;
in response to said aggregated interest, notifying a marketer of said product or service via electronic messaging of said aggregated interest;
enabling said marketer to generate a sales offer; and
communicating said sales offer to said users via said Internet thereby to produce a sale of said product or service.

2. A method of monitoring Internet information to generate a reverse auction respecting sale of a product or service, said method comprising the steps of:
providing a user interface linked to an Internet server to enable multiple users to define respective alerts regarding an Internet resource about said product or service;
creating and storing user accounts in a database with associated user-defined alerts;
accessing said database to aggregate said user-defined alerts to determine an aggregated interest in said product or service;
in response to said aggregated interest, notifying said users of said aggregated interest in said product or service via electronic messaging;
enabling said users to generate a volume purchase offer for said product or service based on said aggregated interest; and
communicating said volume purchase offer to a supplier of said product or service thereby to produce a sale.

3. A method of monitoring Internet information to identify a group of users having a shared interest in a piece of information, said method comprising the steps of:
providing a user interface linked to an Internet server to enable respective users to define alerts respecting an Internet resource;
creating and storing user accounts in a database with associated user-defined alerts;
accessing said database to aggregate said user-defined alerts to determine an aggregated interest in said piece of information; and
in response to said aggregated interest, notifying said users of said shared interest in said piece of information.

4. The method for claim 1, further comprising the step of creating said alert from results of a search of an Internet resource.

5. The method of claim 1, further comprising the step of creating said alert according to user-defined inputs that filter, monitor, or compare web information for change analysis.

6. The method of claim 1, wherein said creating and storing step further includes creating and storing an indication of intensity of said alert according to at least one of specificity of content selection, clipping, clipping with monitoring, destination return, number of sites on same subject, price, frequency of monitoring, time for automated removal of monitoring, channel for notification of changes and type of notification, and analysis of change.

7. The method of claim 1, further comprising the step of enabling visualization of said alert by displaying said alert on said user interface as an icon.

8. The method of claim 7, further comprising the step of changing said icon in response to a change respecting said Internet resource wherein said changing of said icon comprises altering color, shape, selection of a logo or an image, indication of percent of change, indication of extent of usage or user ranking, or indication of availability of comments or reviews respecting said Internet resource.

9. The method for claim 2, further comprising the step of creating said alert from results of a search of an Internet resource.

10. The method of claim 2, further comprising the step of creating said alert according to user-defined inputs that filter, monitor, or compare web information for change analysis.

11. The method of claim 2, wherein said creating and storing step further includes creating and storing an indication of intensity of said alert according to at least one of specificity of content selection, clipping, clipping with monitoring, destination return, number of sites on same subject, price, frequency of monitoring, time for automated removal of monitoring, channel for notification of changes and type of notification, and analysis of change.

12. The method of claim 2, further comprising the step of enabling visualization of said alert by displaying said alert on said user interface as an icon.

13. The method of claim 12, further comprising the step of changing said icon in response to a change respecting said Internet resource wherein said changing of said icon comprises altering color, shape, selection of a logo or an image, indication of percent of change, indication of extent of usage or user ranking, or indication of availability of comments or reviews respecting said Internet resource.

14. The method for claim 3, further comprising the step of creating said alert from results of a search of an Internet resource.

15. The method of claim 3, further comprising the step of creating said alert according to user-defined inputs that filter, monitor, or compare web information for change analysis.

16. The method of claim 3, wherein said creating and storing step further includes creating and storing an indication of intensity of said alert according to at least one of specificity of content selection, clipping, clipping with monitoring, destination return, number of sites on same subject, price, frequency of monitoring, time for automated removal of monitoring, channel for notification of changes and type of notification, and analysis of change.

17. The method of claim 3, further comprising the step of enabling visualization of said alert by displaying said alert on said user interface as an icon.

18. The method of claim 17, further comprising the step of changing said icon in response to a change respecting said Internet resource wherein said changing of said icon comprises altering color, shape, selection of a logo or an image, indication of percent of change, indication of extent of usage or user ranking, or indication of availability of comments or reviews respecting said Internet resource.

* * * * *